US009161318B2

(12) United States Patent
Zirwas et al.

(10) Patent No.: US 9,161,318 B2
(45) Date of Patent: Oct. 13, 2015

(54) CONFIGURING POWER DISTRIBUTION WITHIN COOPERATION AREAS OF CELLULAR COMMUNICATION NETWORKS

(75) Inventors: Wolfgang Zirwas, Munich (DE); Wolfgang Mennerich, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 39 days.

(21) Appl. No.: 14/001,191

(22) PCT Filed: Feb. 24, 2011

(86) PCT No.: PCT/EP2011/052745
§ 371 (c)(1),
(2), (4) Date: Nov. 8, 2013

(87) PCT Pub. No.: WO2012/113454
PCT Pub. Date: Aug. 30, 2012

(65) Prior Publication Data
US 2014/0057618 A1 Feb. 27, 2014

(51) Int. Cl.
*H04M 3/00* (2006.01)
*H04W 52/24* (2009.01)
*H04B 7/02* (2006.01)
(Continued)

(52) U.S. Cl.
CPC ............ *H04W 52/243* (2013.01); *H04B 7/024* (2013.01); *H04W 52/40* (2013.01); *H04W 28/048* (2013.01); *H04W 52/283* (2013.01); *H04W 52/42* (2013.01); *H04W 72/12* (2013.01); (Continued)

(58) Field of Classification Search
CPC . H04L 1/0026; H04L 5/0032; H04W 52/243; H04W 52/283; H04W 72/1205

USPC .......................................................... 455/418
See application file for complete search history.

(56) References Cited

U.S. PATENT DOCUMENTS

2008/0159196 A1* 7/2008 Roh et al. ....................... 370/311
2008/0268833 A1* 10/2008 Huang et al. .................. 455/425
(Continued)

FOREIGN PATENT DOCUMENTS

EP 2 242 187 A1 10/2010
WO WO2011/018121 A1 2/2011

OTHER PUBLICATIONS

Seungah, Chae, et al.; "Antenna selected space-time block code coordinated multi-cell transmission"; 2010 IEEE 21st International Symposium on Personal Indoor and Mobile Radio Communications (PIMRC); Sep. 26-30, 2010; abstract only.
3GPP TSG RAN WG1 Meeting #60; "DL CoMP configuration"; San Francisco, USA, Feb. 21-26, 2010; R1-101617; 5 pgs.

*Primary Examiner* — Kwasi Karikari
(74) *Attorney, Agent, or Firm* — Harrington & Smith

(57) ABSTRACT

There is provided a method for configuring a power distribution within a cellular network system. The cellular network system includes at least one cooperation area. The at least one cooperation area is defined by at least two base stations, each including at least one antenna, wherein each base station has at least one beam. The method includes configuring the base stations to transmit at a first transmit power level for providing a first receiving power level for a user equipment at a center region of the cooperation area, and configuring the base stations to transmit at a second transmit power level for providing a second receiving power level at a border region of the cooperation area, wherein the second receiving power level is lower than the first receiving power level.

15 Claims, 2 Drawing Sheets

(51) Int. Cl.
*H04W 52/40* (2009.01)
*H04W 28/04* (2009.01)
*H04W 52/28* (2009.01)
*H04W 52/42* (2009.01)
*H04W 72/12* (2009.01)
*H04W 84/18* (2009.01)
*H04W 88/08* (2009.01)

(52) U.S. Cl.
CPC .............. *H04W 84/18* (2013.01); *H04W 88/08* (2013.01); *Y02B 60/50* (2013.01)

(56) References Cited

U.S. PATENT DOCUMENTS

| | | | |
|---|---|---|---|
| 2009/0239569 A1* | 9/2009 | Dottling et al. | 455/522 |
| 2010/0208610 A1* | 8/2010 | Ihm et al. | 370/252 |
| 2010/0267408 A1* | 10/2010 | Lee et al. | 455/509 |
| 2011/0034174 A1* | 2/2011 | Xu et al. | 455/447 |
| 2012/0106442 A1* | 5/2012 | Xiao | 370/328 |

* cited by examiner

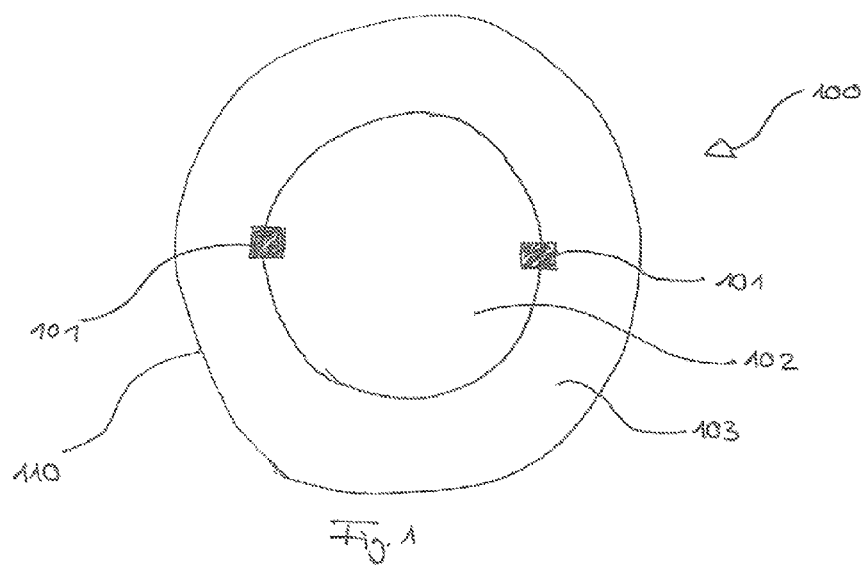
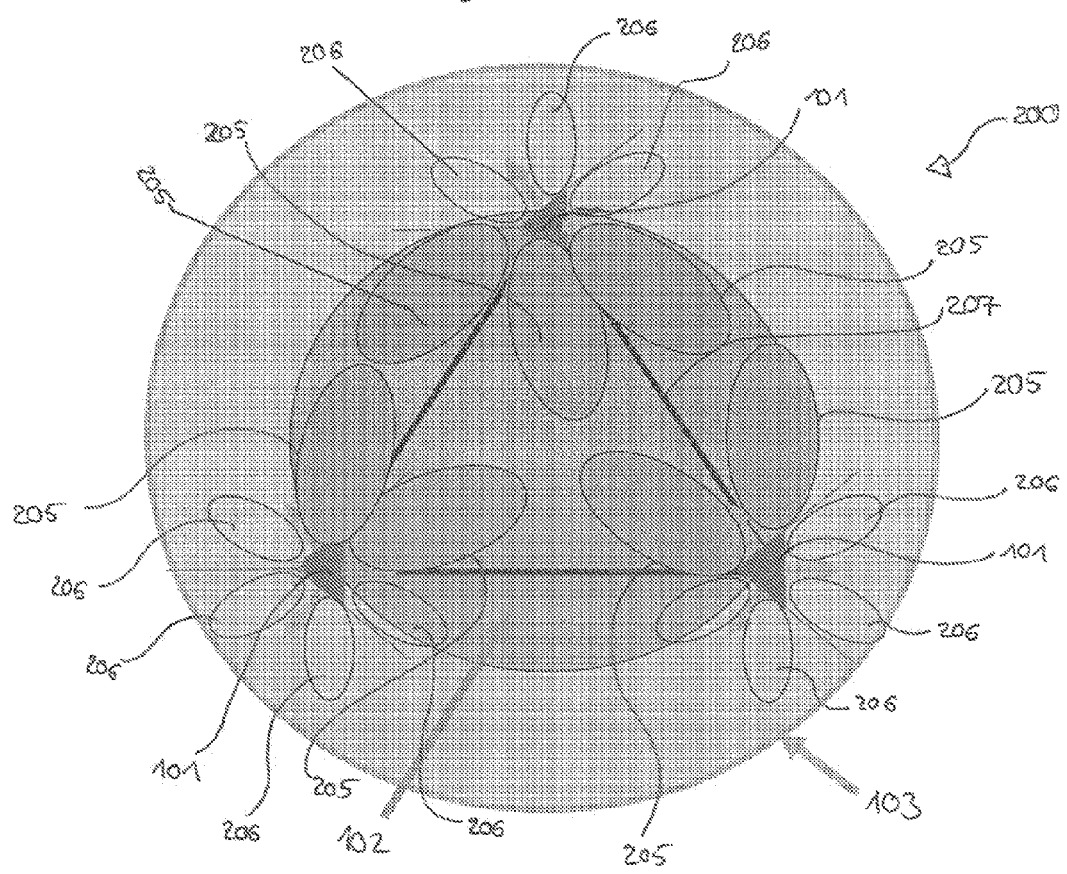

CONFIGURING POWER DISTRIBUTION WITHIN COOPERATION AREAS OF CELLULAR COMMUNICATION NETWORKS

FIELD OF THE INVENTION

The present invention relates to the field of cellular communication networks and in particular to cellular communication networks which are organized in cooperation areas.

BACKGROUND OF THE INVENTION

Modern wireless communication networks often are organized in a cell structure. In LTE (3GPPP Long-Term Evolution), cells may be organized in so called cooperation areas. Cooperation areas may be defined by one or more base stations (eNodeBs, eNBs) serving one or more cells. Between neighbouring cooperation areas, interferences may occur, especially in edge regions of the cooperation areas (CAs).

Interference floor reduction is a research issue for a long time, which led to many proposals like inter cell interference cancellation (ICIC), increased antenna tilting, SON optimization algorithms, scheduling, coordinated beamforming, etc. Full network wide cooperation would overcome the interference floor completely, but is practically infeasible.

In view of the above-described situation, there exists a need for an improved technique that enables to provide a cellular communication system substantially avoiding or at least reducing one or more of the above-identified problems.

SUMMARY OF THE INVENTION

This need may be met by the subject matter according to the independent claims. Advantageous embodiments of the herein disclosed subject matter are described by the dependent claims.

According to a first aspect of the herein disclosed subject matter, there is provided a method for configuring a power distribution within a cellular network system, the cellular network system comprising at least one cooperation area, wherein the at least one cooperation area is defined by at least two base stations, each comprising at least one antenna, wherein each base station has at least one beam or a plurality of beams, the method comprising configuring the base stations to transmit at a first transmit power level for providing a first receiving power level for a user equipment at a center region of the cooperation area, and configuring the base stations to transmit at a second transmit power level for providing a second receiving power level at a border region of the cooperation area, wherein the second receiving power level is lower than the first receiving power level.

This aspect of the invention is based on the idea that by appropriate configuring the power distribution of a cooperation area within a cellular network, the interference floor reduction may be improved.

The base stations may comprise one or more antennas, as well as one or more beams. A beam may be an emission of rays corresponding to for example broadcast signals. A base station or an antenna of the base station may provide a specific characteristic of beams.

For example, in an embodiment, a base station or eNodeB may serve more than one cell. For example, a base station may use four antenna elements per cell.

According to this aspect of the herein disclosed subject matter, a power distribution within a cellular network may be provided in the form of a "tortoise". The name "tortoise" concept may be used for indicating that the power distribution of a cooperation area (CA) has the shape of a tortoise, i.e. the receiving power (Rx power) for the served users at the center of the CAs is as high as possible, while the interference power into other areas outside of the CA is blocked as far as possible. User equipments, which have their strongest interferer within the cooperation are, may be scheduled into this cooperation area. The power levels of the cooperation area are adapted such that interferences decrease very fast outside the cooperation area.

According to an embodiment, the user equipment may be for example a mobile phone or a computer.

The term "center region" may denote a part of the cooperation area being arranged between the two base stations and representing a central area of the cooperation area. The term "border region" may denote an area of the cooperation area being edges of the cooperation area.

According to an embodiment, the method further comprises configuring each base station in such a manner that a beam being directed towards the center region is transmitted with a first transmit power level, and a beam being directed towards the border region is transmitted with a second transmit power level, wherein the second transmit power level is lower than the first transmit power level.

This idea is based on so called beamforming. Beamforming is a signal processing technique used for directional signal transmission or reception. This spatial selectivity is achieved by using adaptive or fixed receive/transmit beampatterns. The form of the beams as well as the power level may be adapted to provide more power towards the center region of the cooperation area and to provide less power towards the border region of the cooperation area in order to reduce interferences at the edges of the cooperation area.

Beamforming may take advantage of interference to change the directionality of the beam. When transmitting, a beamformer controls the phase and relative amplitude of the signal at each transmitter, in order to create a pattern of constructive and destructive interference in the wavefront.

According to a further embodiment, the first transmit power level is in the range of 36 dBm to 44 dBm and the second transmit power level is in the range of 30 dBm to 35 dBm.

That means that the transmit power level of the beams is higher towards the center region and lower towards the border region. The first transmit power level may be approximately 40 dBm and the second transmit power level may be approximately 34 dBm.

According to a further embodiment, the method further comprises configuring each base station in such a manner that a beam being directed towards the center region is tilted down by a first tilt angle, and a beam being directed towards the border region is tilted down by a second tilt angle, wherein the second tilt angle is greater than the first tilt angle.

The tilt angles may be defined in respect to a vertical axis. By adjusting the tilt angles, the emission characteristics of the antennas may be influenced in order to provide a higher power level towards the center region and a lower power level towards the border region.

According to a further embodiment, the second tilt angle is greater than the first tilt angle by at least a factor of 1.5.

For example, the first tilt angle may be 10° and the second tilt angle may be 15°. The tilt angle may be defined in respect to a vertical axis, for example being defined by the corresponding base station.

According to a further embodiment, the method further comprises configuring the base stations to operate according to coordinated multi point transmission.

The so called joint precoding coordinated multi point transmission (JP CoMP) may have the need to separate the network into so called cooperation areas (CA) of reasonable size. While interference within a CA might be canceled, between CAs the inter CA interference might easily spoil most of the potential performance gains.

This topic may be even more complicated as CAs would have to be setup user centric including the e.g. three strongest interfering cells for an UE. Typically in non-line of sight (NLOS) conditions there will be only a very small number of users seeing the same set of strongest cells leading to a very small penetration rate of UEs gaining form cooperation.

With the partial CoMP concept a significant progress could be achieved as being demonstrated by according system level (SL) simulations. It combines basically to methods, i.e. (i) increasing the CA to e.g. 3 sites with 3 cells per site so that the overall size of the CA is 9. By only reporting channel state information (CSI) for the e.g. 3 strongest cells out of the 9 cells low feedback overhead and a high penetration rate can be achieved at the same time. (ii) The inter CA interference may significantly reduced by dividing the available resources like frequency subbands into 6 subbands. In each subband different CAs are setup. This allows scheduling almost all UEs as CA center UEs, just by scheduling them into the best fitting subband/setup of CA.

According to a further embodiment, the method further comprises configuring each base station to operate at least one antenna dedicated to the cooperation area at a specific frequency subband and to operate at least one antenna dedicated to other cooperation areas at at least one frequency subband other than the specific frequency subband.

By dividing the available frequency band into subbands, interferences between neighboring CAs may be further reduced when neighboring CAs uses different frequency subbands.

According to a further embodiment, the method further comprises configuring each base station to operate at least one antenna dedicated to the cooperation area at specific time slots and to operate at least one antenna dedicated to other cooperation areas at time slots other than the specific time slots.

In this embodiment, the base stations may be configured such that for different CAs different time slots may be used for transmission. This may also reduce interferences between neighboring CAs.

According to a further embodiment, the method further comprises measuring the receiving power level of the cooperation area and the at least one further cooperation area.

User equipments may have to do reference signal received power (RSRP) measurements for different partial CoMP areas, that means for example for different frequency subbands and/or time slot allocation. So instead of one conventional wideband measurement at any time slot now for example six different measurements for six different partial CoMP areas might have to be done to find out the best fitting partial CoMP area, i.e. frequency subband/time slots.

According to a further embodiment, measuring the receiving power level is performed per frequency subband and/or time slot.

A first broadcast or specific CoMP multicast/unicast message may comprise the information that the tortoise concept with different antenna tilting, Tx power, beamforming per subband or for different time slots is used at all. More generally, a message may comprise the information or instruction to do subband wise instead of wideband RSRP measurements, without direct relation to the tortoise concept.

According to a further embodiment, the method further comprises sending information messages to inform user equipments about a subband and/or time slot allocation by using a radio resource management algorithm.

Frequency subbands or time slots might have to be predefined over large areas of the network or might alternatively be setup or optimized by self optimizing network (SON) algorithms. In case of a radio resource management (RRM) algorithm for setting up subbands, messages might be required to inform user equipments about the subband/time slot allocation.

A further optimization may be performed by applying the reference signals for RSRP measurements not per cell but per partial CoMP areas comprising all cells and beams of the CAs. Each of the for example six subframes or time slots might than use for all cells of the CA the same RSs together with the beamformers, Tx power allocation and antenna tilting. One option would be to use CSI RSs from LTE Rel 10 for this purpose.

According to a second aspect of the herein disclosed subject matter, there is provided a base station for a cellular network system, the cellular network system comprising at least one cooperation area, wherein the at least one cooperation area is defined by the base station and at least one further base station, the base station comprising at least one antenna, wherein the base station has at least one beam or a plurality of beams, the base station being adapted to be configured to transmit at a first transmit power level for providing a first receiving power level for a user equipment at a center region of the cooperation area, and the base station being further adapted to be configured to transmit at a second transmit power level for providing a second receiving power level for a user equipment at a border region of the cooperation area, wherein the second receiving power level is lower than the first receiving power level.

The base station may be any type of access point or point of attachment, which is capable of providing a wireless access to a telecommunication network. Thereby, the wireless access may be provided for a user equipment or for any other network element, which is capable of communicating in a wireless manner.

The base station may comprise a receiving unit, for example a receiver as known by a skilled person. The base station may also comprise a transmitter. The receiver and the transmitter may be implemented as one single unit, for example as a transceiver. The transceiver or the receiving unit and the transmitter may be adapted to communicate with a further base station or the user equipment via an antenna.

The base station may be associated with any kind of control unit or system to be configured to transmit at a first transmit power level for providing a first receiving power level for a user equipment at a center region of the cooperation area, and to be configured to transmit at a second transmit power level for providing a second receiving power level for a user equipment at a border region of the cooperation area, wherein the second receiving power level is lower than the first receiving power level. The base station may comprise one or more antennas, as well as one or more beams. A beam may be an emission of rays corresponding to for example broadcast signals. A base station or an antenna of the base station may provide a specific characteristic of beams.

According to a third aspect of the herein disclosed subject matter, there is provided a control unit for configuring at least two base stations as described above by controlling a method as set described above.

The control unit may be any kind of control unit being capable of controlling a method as described above. The control unit may be a processor or any other functional unit. The control unit may be positioned within one base station or arranged in any other part of the cellular network system being at a higher level. The control unit may be associated with each base station of the cooperation area or may be associated with base stations of more than one cooperation area.

In a further embodiment, the control unit is associated with an operation and maintenance system.

In mobile networks, an Operations and Maintenance Center may be the central location to operate and maintain the network. The control unit may be associated with such a center.

According to a fourth aspect of the herein disclosed subject matter, there is provided a cellular network system for configuring a power distribution within the cellular network system, the cellular network system comprising at least two base stations as described above.

The cellular network system may further comprise a control unit as described above. The control unit may be arranged in any control system of the network system, for example in an operation and maintenance system.

Generally herein, the method and embodiments of the method according to the first aspect may include performing one or more functions described with regard to the second, third or fourth aspect or an embodiment thereof. Vice versa, the base station, control unit or cellular network system and embodiments thereof according to the second, third and fourth aspect may include units or devices for performing one or more functions described with regard to the first aspect or an embodiment thereof.

According to a fifth aspect of the herein disclosed subject matter, a computer program for configuring a power distribution, is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station and a method of configuring a power distribution. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless other notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWINGS

FIG. 1 shows a cooperation area of a cellular communication network with two base stations in accordance with embodiments of the herein disclosed subject matter.

FIG. 2 shows a cooperation area of a cellular communication network with three base stations in accordance with embodiments of the herein disclosed subject matter.

DETAILED DESCRIPTION

Figure 3:
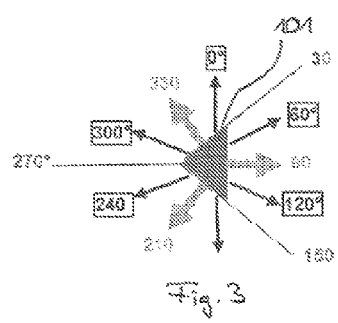
FIG. 3 shows the orientation of an antenna of a base station in accordance with embodiments of the herein disclosed subject matter.

The illustration in the drawings is schematic. It is noted that in different figures, similar or identical elements are provided with the same reference signs or with reference signs, which are different from the corresponding reference signs only within the first digit.

In the following, embodiments of the herein disclosed subject matter are illustrated with reference to the drawings and reference to aspects of current standards, such as LTE. However, such reference to current standards is only exemplary and should not consider as limiting the scope of the claims.

Embodiments of the herein described subject matter lie in the field of mobile radio system concepts like LTE, LTE-A and its evolution. Such systems may deal with the case of joint precoding coordinated multi point (JP-CoMP) transmission. There has been a CoMP study item (SI) for LTE Rel 10, but without clear conclusion a remarkable system level gain could be found only for very complex system setups. A new CoMP SI has just started to find a better way of exploiting the theoretically well known performance gains for practical mobile radio systems.

Embodiments described in the following further evolve the partial CoMP concept to the so called 'tortoise' concept, where the name tortoise should indicate that the power distribution of a cooperation area (CA) has the shape of a tortoise, i.e. the Rx power for the served users at the center of the CAs is as high as possible, while the interference power into other areas outside of the CA is blocked as far as possible.

The goal of the invention is to provide techniques to localize transmission power of a CA to wanted users and to reduce interference into areas outside of a CA.

For JP CoMP, one main challenge is the need to separate the network into so called cooperation areas (CA) of reasonable size. While interference within a CA might be canceled, between CAs the inter CA interference might easily spoil most of the potential performance gains.

This topic is even more complicated as CAs would have to be setup user centric including the e.g. 3 strongest interfering cells for an UE. Typically in NLOS conditions, there will be only a very small number of users seeing the same set of strongest cells leading to a very small penetration rate of UEs gaining form cooperation.

With the partial CoMP concept a significant progress could be achieved as being demonstrated by according system level (SL) simulations. It combines basically to methods, i.e.

(a) increasing the CA to e.g. 3 sites a' 3 cells per site so that the overall size of the CA is 9. By only reporting channel state information (CSI) for the e.g. 3 strongest cells out of the 9 cells low feedback overhead and a high penetration rate can be achieved at the same time.

(b) The inter CA interference is significantly reduced by dividing the available resources like frequency subbands into 6 subbands. In each subband different CAs are setup. This allows scheduling almost all UEs as CA center UEs, just by scheduling them into the best fitting subband/setup of CA.

This concept works well. At the same time there is still some significant interference floor limiting further performance gains, especially for UEs near to the CA or cell edge. For these UEs, the Rx power will be small due to the large distance to the eNB transmitters and therefore high path losses. At the same time the interference floor from other cells is relative constant over the whole cell area of the CA or even higher at the cell border as the interfering transmitters have a relative shorter distance.

Without the strong interference floor, highest performance gains would be for the cell edge users. As a simple example take two cells and LOS conditions. The SIR for UEs at the cell edge would be exactly 0 dB, and after cooperation and IF cancelation it is limited only by the noise floor, e.g. might be as high as 20 dB.

The goal of embodiments of the herein described subject matter is therefore to reduce the inter-CA interference floor as far as possible, ideally to a value e.g. below 20 dB (relative to Rx power for CA centric served UEs). In that case all UEs could be served with the highest modulation and coding scheme of LTE, for example 64 QAM5/6 requiring about 17 dB SINR.

One embodiment of a cellular network system 100 is shown in FIG. 1. The network system comprises one or more cooperation areas, wherein one cooperation area 110 is shown. The cooperation area is defined by at least two base stations 101. Each base station comprises at least one antenna (not shown) and each base station has a plurality of beams (not shown). The base stations are configured to transmit at a first transmit power level for providing a first receiving power level for a user equipment (not shown) at a center region 102 of the cooperation area. The base stations are further configured to transmit at a second transmit power level for providing a second receiving power level at a border region 103 of the cooperation area. The second receiving power level is lower than the first receiving power level for reducing interferences in the border region and for providing a tortoise shape of the power distribution. A specific shaping of the interference floor is intended avoiding inter CA interference as far as possible. User equipments, which have their strongest interferer within the cooperation are, may be scheduled into this cooperation area. The power levels of the cooperation area are adapted such that interferences decrease very fast outside the cooperation area.

Interference floor reduction is a research issue for a long time, which led to many proposals like inter cell interference cancellation (ICIC), increased antenna tilting, SON optimization algorithms, scheduling, coordinated beamforming, etc. Full network wide cooperation would overcome the interference floor completely, but is practically infeasible.

From the results of the first CoMP study item for LTE Rel 10, it is obvious that there is no real powerful practicable solution available yet, which really reduces the interference floor significantly.

According to embodiments, the partial CoMP concept may be combined with specific interference shaping techniques. The interference shaping has the goal to concentrate the Tx power of all eNBs of a CA as far as possible at the center of the CAs, while at the borders of the CA the interference power should decrease as fast as possible leading to tortoise like shape of the Rx-power for the overall CA.

There are three exemplary means to shape the interference, i.e.:
  wideband beamforming per cell participating at the CA
  Tx power adaptation per beam
  antenna tilting FIG. 2 shows an example of a cellular network system 200 comprising a CA consisting of 3 sites with 3 cells/sectors each. Under the assumption of e.g. 4 antenna elements per cell a beamwidth of about 33 degree has been assumed in the following. This allows having e.g. 2 beams per 120° sector, which is conventionally served by a single 60°-70° horizontal beam. Such a configuration is shown in FIG. 3 showing an antenna element of a base station 101.

The CA of FIG. 2 comprises three base stations 101 being arranged in a triangle 207. The grey beams 205 in FIG. 2 directed to the center region 102 of the CA use high Tx power of for example 40 dBm plus moderate downtilt of e.g. 10°, while the unfilled small beams 206 indicate a reduced Tx power of for example 34 dBm plus a strong downtilt of e.g. 15°. This combination may ensure good coverage for the center region 102 of the CA and fast decline of interference power for the border region 103 of the CA, i.e. generates the intended tortoise like shape of the Rx power. The tortoise concept for cooperation area (CA) consisting of 3 site and 9 cells a' 2 beams of 33° each generates a high Rx power area of 0 dB 102 in center of CA and sharp decline of interference into other CAs (−20 dB line) 103.

Figure 5:
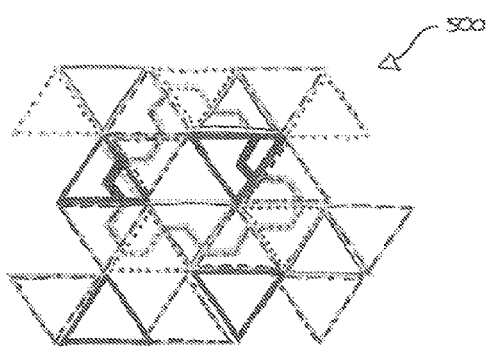
FIG. 5 shows the cooperation areas of FIG. 4 using different frequency subbands in accordance with embodiments of the herein disclosed subject matter.

Low power at CA borders means that UEs in that area will be served with very bad coverage. For that reason the concept may be combined with the partial CoMP concept. The here important aspect is that the frequency band is divided into subbands and for each subband one site participates in a different CA as indicated by the different lines of the triangles of the cellular network system in FIG. 5. As a result almost all UEs can be served as CA center UEs just by selecting the proper frequency subband. In addition within on subband CA centers (triangles with same lines) are separated by some distance, i.e. are not adjacent to each other as it is the case for cells of conventional cellular radio systems. Combining all subbands—i.e. all triangles—may ensure that all UEs are served as center UEs of one of the CAs. For one subband (triangles having the same lines) a minimum distance between CA centers is guaranteed (right) so that inter CA interference is below e.g. 20 dB with high probability.

Figure 4:
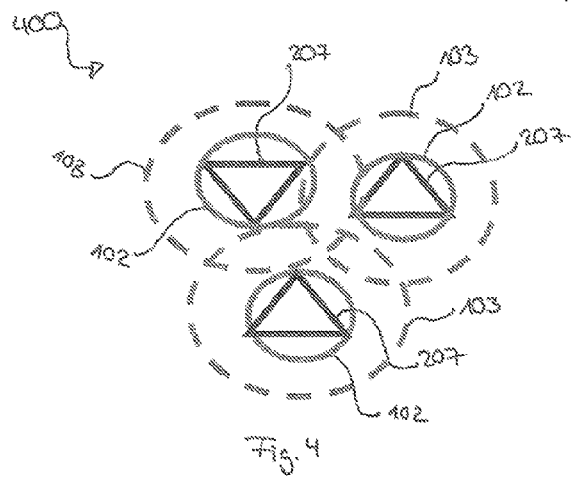
FIG. 4 shows three cooperation areas being arranged in some distance in accordance with embodiments of the herein disclosed subject matter.

The cellular network system 400 of FIG. 4 indicates that for e.g. a inter site distance of 500 m (solid lines) there will be about 500 m inter CA distance indicated by broken lines, i.e.

the inter CA interference should ideally decline within these 500 m below the intended interference floor level.

Ray tracing simulations have been performed with the above mentioned beam power and tilt parameters for downtown Munich for a randomly selected location without further optimization of transmitter locations (Tx heights are 25 m). The ray tracing results for the received power for the combination of all 3 sites and all 6 beams per site have shown that the tortoise concept can localize—as intended—the Tx power into the center area of an CA with very good coverage even without long optimization procedures and that already after further 500 m the Rx power has declined by more than 20 dB.

The well known wave guiding effect for long streets cannot be avoided—or at least not so easily avoided. This longer reaching interference will be limited to relative small areas. In addition these interferers might be canceled ideally by interference rejection combining (IRC) receivers.

Figure 6:
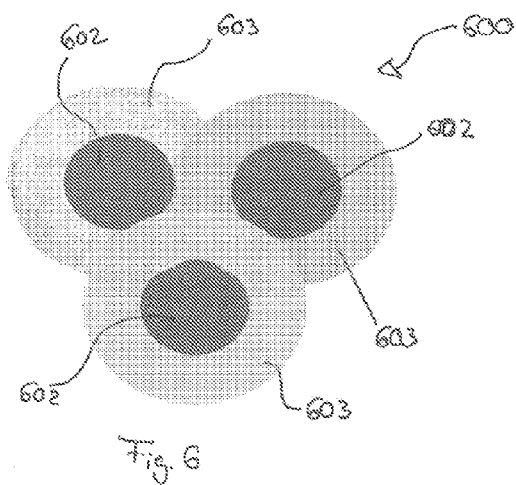
FIG. 6 shows a conventional cellular network using ICIC.

FIG. 6 shows a conventional cellular network 600 using ICIC. The main difference is that Rx power for cell edge areas 603 is increased on cost of cell center areas. In the center region, the Rx power is reduced. That leads to no inter cell IF reduction and performance loss for cell center UEs.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the control unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularity on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein. According to an embodiment, the controller comprises a processor device including at least one processor for carrying out at least one computer program corresponding to a respective software module.

It should be noted that the term "comprising" does not exclude other elements or steps and the "a" or "an" does not exclude a plurality. Also elements described in association with different embodiments may be combined. It should also be noted that reference signs in the claims should not be construed as limiting the scope of the claims.

In order to recapitulate the above described embodiments of the herein disclosed subject matter one can state:

The benefit of the tortoise concept is a largely reduced interference floor for inter CA interference within each frequency subband, which results in significantly higher system capacity for interference limited scenarios like urban macro with 500 m ISD. For this purpose, antenna tilting, Tx power per beam and beam directions for CAs instead of per cell may be optimized according to embodiments of the herein described subject matter and may be combined with the partial CoMP concept, using different setups of CAs per frequency subband (or per time slot).

Compared to conventional antenna tilting the optimization is here for a set of cells comprising the CA. Novel is that sites—and therefore the cells of one site—may belong simultaneously to different CAs, separated by different resources like frequency subbands or time slots. As a consequence each cell of a site will need different Tx-powers as well as different antenna tilts for different frequency subbands or time slots.

One option for achieving this is to use active antenna systems allowing frequency dependent antenna tilts (3D beamforming) or to use as resources time slots, where for each time slot different antenna tilts can be generated. The second is easier to realize as it requires only an electronically phase shift per time slot. As most simple alternative one might even think of several antenna elements with different tilts in combination with an antenna selection algorithm. One might use a less powerful but even more simplified scheme, where only the Tx-power will be adapted for different subbands, while antenna tilts are kept constant.

List of Reference Signs:
100 cellular network system
101 base station
102 center region of cooperation area
103 border region of cooperation area
110 cooperation area
200 cooperation area
205 beams transmitting towards center region
206 beams transmitting towards border region
207 triangle defined by base stations
400 cellular network system
500 cellular network system
600 prior art cellular network system
602 region of low power
603 region of high power

The invention claimed is:

1. A method comprising:
configuring at least two base stations to transmit at a first transmit power level for providing a first receiving power level for a user equipment at a center region of the at least one cooperation area,
wherein the at least two base stations define the at least one cooperation area,
wherein the at least one cooperation area is a cooperation area of a joint transmission CoMP system
wherein each base station of the at least two base stations comprises at least one antenna, and
wherein each base station has at least one beam; and
configuring the at least two base stations to transmit at a second transmit power level for providing a second receiving power level at a border region of the at least one cooperation area,
wherein the second receiving power level is lower than the first receiving power level, and wherein a power distribution between the first and second transmit power levels within the cooperation area shapes an interference floor which avoids interference between cooperation areas.

2. The method of claim 1, further comprising:
configuring each base station in such a manner that
a beam being directed towards the center region is transmitted with a first transmit power level, and
a beam being directed towards the border region is transmitted with a second transmit power level,
wherein the second transmit power level is lower than the first transmit power level.

3. The method of claim 1, further comprising:
configuring each base station in such a manner that
a beam being directed towards the center region is tilted down by a first tilt angle, and
a beam being directed towards the border region is tilted down by a second tilt angle,
wherein the second tilt angle is greater than the first tilt angle.

4. The method of claim 1, further comprising:
configuring the base stations to operate according to coordinated multi point transmission for operating the cooperation area and at least one further cooperation area.

5. The method of claim 4, further comprising:
configuring each base station
to operate at least one antenna dedicated to the cooperation area at a specific frequency subband and
to operate at least one antenna dedicated to other cooperation areas at at least one frequency subband other than the specific frequency subband.

6. The method of claim 4, further comprising:
configuring each base station
to operate at least one antenna dedicated to the cooperation area at specific time slots and
to operate at least one antenna dedicated to other cooperation areas at time slots other than the specific time slots.

7. The method of claim 4, further comprising:
measuring the receiving power level of the cooperation area and the at least one further cooperation area.

8. The method of claim 7 wherein measuring the receiving power level is performed per frequency subband, per time slot, or per both.

9. The method of claim 4, further comprising:
sending information messages to inform user equipments about a subband and/or time slot allocation by using a radio resource management algorithm.

10. An apparatus comprising:
at least one processor and at least one memory including computer program code, wherein the at least one memory and the computer code are configured, with the at least one processor, to cause the apparatus to at least perform the following:
configuring at least two base stations in a cellular network system comprising at least one cooperation area to transmit at a first transmit power level for providing a first receiving power level for a user equipment at a center region of the at least one cooperation area,
wherein the at least two base stations define the at least one cooperation area,
wherein the at least one cooperation area is a cooperation area of a joint transmission CoMP system
wherein each base station of the at least two base stations comprises at least one antenna, and
wherein each base station has at least one beam; and
configuring the at least two base stations to transmit at a second transmit power level for providing a second receiving power level at a border region of the at least one cooperation area,
wherein the second receiving power level is lower than the first receiving power level, and
wherein a power distribution between the first and second transmit power levels within the cooperation area shapes an interference floor which avoids interference between cooperation area.

11. The apparatus of claim 10,
wherein a first beam of the at least one beam of each base station is directed toward the center region and is transmitted with a first transmit power level,
wherein a second beam of the at least one beam of each base station is directed toward the center region and is transmitted with a second transmit power level, and
wherein the second transmit power level is lower than the first transmit power level.

12. The apparatus of claim 10, wherein the apparatus is a control unit.

13. The apparatus of claim 10, wherein the apparatus is one of the at least two base stations.

14. A computer program product embodied on a non-transitory computer-readable medium in which a computer program is stored that, when being executed by a computer, is configured to provide instructions to control or carry out the method of claim 1.

15. A wireless communication system comprising a plurality of devices wherein at least one of said plurality is the apparatus of claim 10.

* * * * *